May 31, 1955
M. DANTZIC
2,709,392
MEANS FOR SUPPORTING A LENS IN A LENS POWER MEASURING INSTRUMENT
Filed Aug. 12, 1952
2 Sheets-Sheet 1
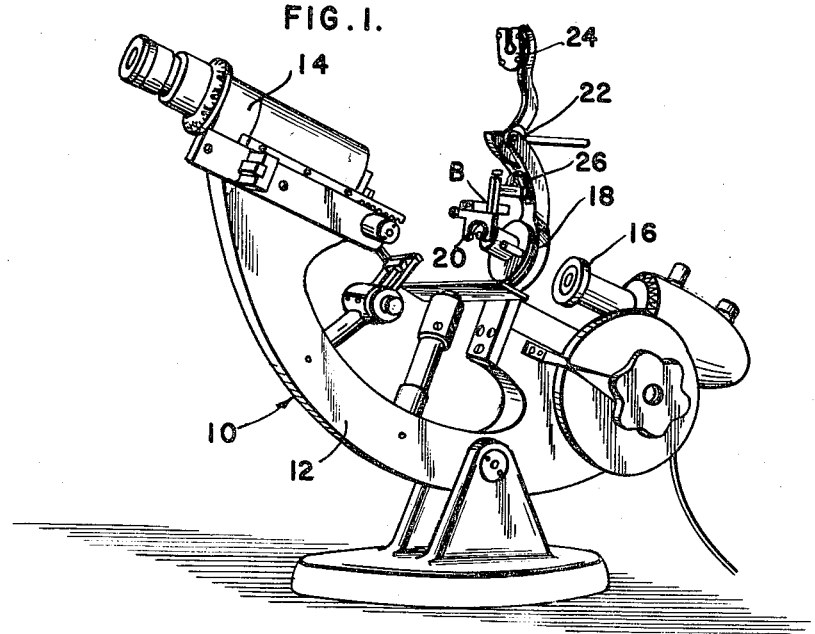
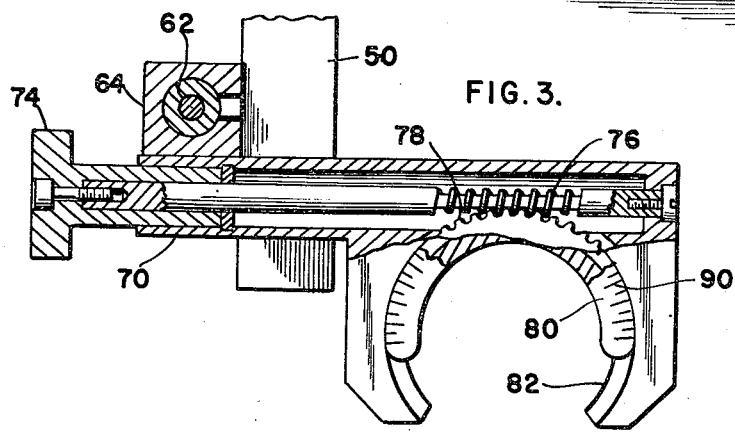
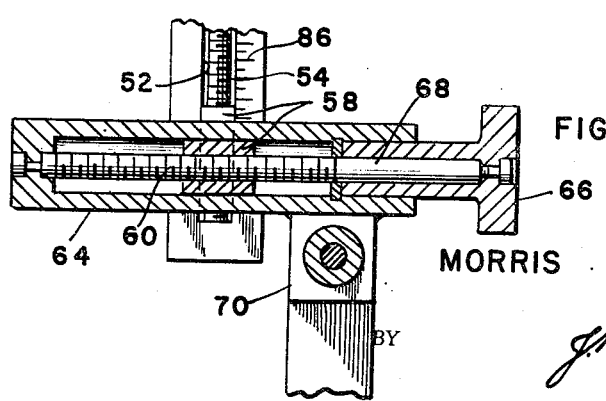
INVENTOR
MORRIS DANTZIC
BY *J. B. Duckman, Jr.*
ATTORNEY May 31, 1955
M. DANTZIC
2,709,392
MEANS FOR SUPPORTING A LENS IN A LENS POWER MEASURING INSTRUMENT
Filed Aug. 12, 1952
2 Sheets-Sheet 2
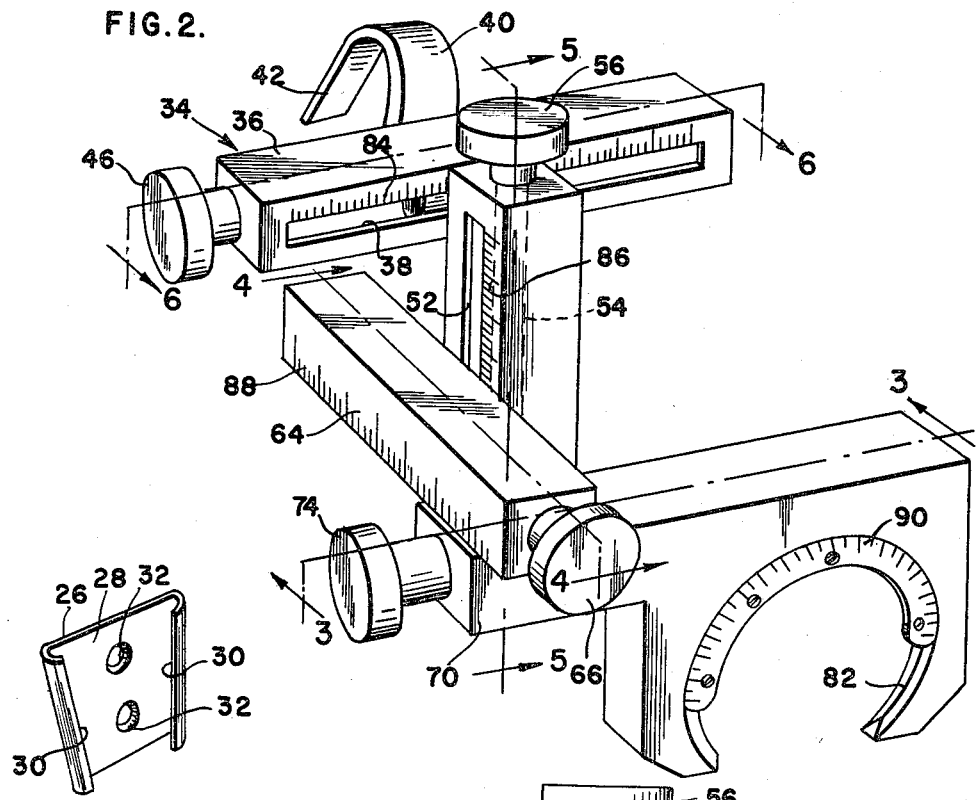
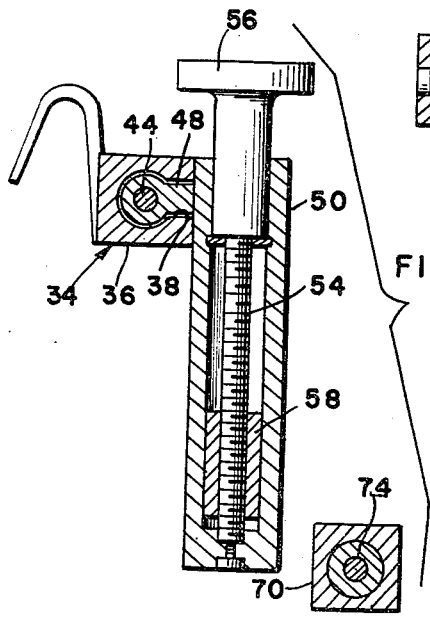
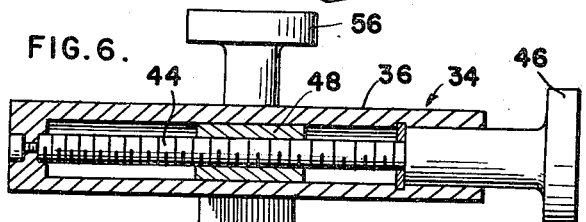
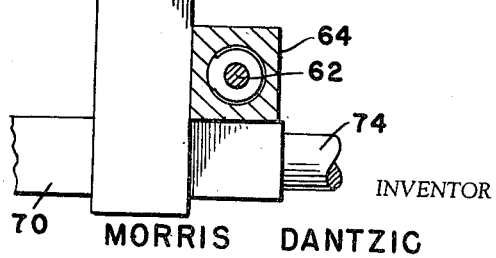
INVENTOR
MORRIS DANTZIC
BY J. B. Dickman, Jr.
ATTORNEY United States Patent Office 2,709,392
Patented May 31, 1955

2,709,392

MEANS FOR SUPPORTING A LENS IN A LENS POWER MEASURING INSTRUMENT

Morris Dantzic, Cumberland, Md.

Application August 12, 1952, Serial No. 303,983

5 Claims. (Cl. 88—56)

This invention relates to means for adjustably supporting a lens adjacent the lens stop in a lens power measuring instrument, and more particularly between the lens stop and the telescope of a "vertometer" of the type distributed by the Bausch and Lomb Optical Company of Rochester, New York.

The primary object of this invention is to compensate for the distance that a trial lens is supported from the eye of a patient during the examination thereof.

Another object is to detachably mount the instrument on the portion of a lens power measuring instrument adjacent the lens stop so that the lens may be held in proper position between the telescope and the target during the measuring thereof.

The above and other objects may be attained by employing this invention which embodies among its features a supporting arm carried intermediate its ends on a lens power measuring instrument adjacent the lens stop, an elongated vertically disposed leg carried adjacent one end by the supporting arm for adjustment longitudinally thereof in a rectilinear path adjacent the supporting arm, an elongated bracket arm carried by the leg for adjustment vertically in a rectilinear path adjacent the leg which lies perpendicular to the path of movement of the leg, said bracket arm also being adjustable horizontally on said leg, and a lens carriage carried by the bracket arm for rotation about an axis which lies perpendicular to the path of movement of the leg.

Other features include a socket adapted to be permanently fixed to a lens power measuring instrument adjacent the lens stop thereof, and a tapered plate carried by the supporting arm intermediate the ends thereof for removably entering the socket and holding the supporting arm in position on the instrument.

In the drawings,

Figure 1 is a perspective view of a lens power measuring instrument showing this improved lens supporting and adjusting means in place thereon, Fig. 2 is an enlarged perspective view of the lens supporting and adjusting means removed from the lens power measuring instrument, Fig. 3 is a sectional view taken substantially on the line 3—3 of Fig. 2, Fig. 4 is a sectional view taken substantially on the line 4—4 of Fig. 2, Fig. 5 is a vertical sectional view taken substantially on the line 5—5 of Fig. 2, Fig. 6 is a horizontal sectional view taken substantially on the line 6—6 of Fig. 2, and Fig. 7 is a perspective view of the supporting socket.

Referring to the drawings in detail a lens power measuring instrument designated generally 10 comprises a crescent-shaped frame 12 supporting adjacent one end a telescope 14 and adjacent its opposite end a target 16. Carried by the frame 12 and extending upwardly therefrom between the target and the telescope is a support 18 for a conventional conical lens stop 20. Pivotally carried as at 22 by the support 18 above the lens stop 20 is a conventional lens clamp 24 which as illustrated is adapted to be moved downwardly adjacent the lens stop 20 to support a lens between the telescope 14 and the target 16. The structure thus far described is conventional and forms no part of this invention except in combination therewith as will be subsequently explained.

Permanently secured in any suitable fashion to the support 18 above the lens stop 20 and below the pivot 22 is a socket member 26 which comprises a tapered plate 28 (Fig. 7) carrying adjacent opposite tapered side edges flanges 30 which converge as they approach the lower end of the plate, and formed intermediate the ends of the plate are countersunk openings 32 for the reception of suitable fasteners by which the plate may be secured to the support 18 between the pivot 22 and the lens stop 20.

This improved lens supporting and adjusting means designated generally 34 comprises a supporting arm 36 of tubular form which is preferably rectangular in cross section, and is provided in one longitudinal side face with an elongated longitudinal slot 38 the purpose of which will hereinafter appear. Carried by and extending upwardly and outwardly from the supporting arm 36 on the side thereof remote from the slot 38 is an extension arm 40 carrying at its upper and outer end a downwardly extending tapered plate or tongue 42 which is adapted to be entered into the space between the flanges 30 and the plate 28 to removably support the supporting arm 34 in place on the lens power measuring instrument. Extending longitudinally through the supporting arm 36 is an adjusting screw 44 which is mounted to rotate about the longitudinal horizontal axis of the supporting arm 34 and carried at one end of said screw 44 is a thumb piece 46 by which the screw may be rotated within the arm 34 adjacent the slot 38. Threadedly engaged with the screw 44 and extending laterally therefrom through the slot 38 is a nut 48 carrying on its outer end a vertically extending leg 50 which as illustrated in the drawings is of tubular form and rectangular in cross section and carries in one side face an elongated longitudinal slot 52. An elongated externally screw threaded shaft 54 extends longitudinally through the leg 50 and carries at one end a thumb piece 56 by which the shaft 54 may be rotated, and threadedly engaged with the shaft and extending laterally therefrom through the slot 52 is a nut 58. This nut 58 carries adjacent its end remote from the shaft 54 an internally screw threaded opening 60 for threaded engagement with an elongated screw 62 which is mounted for rotation about the longitudinal axis of a horizontally extending bracket arm 64 which lies perpendicular to the supporting arm 36 and is adjustable vertically in a rectilinear path which lies perpendicular to the rectilinear path in which the leg 50 moves relative to the supporting arm 36. A thumb piece 66 is carried by the shaft 62 adjacent the end thereof remote from the bracket arm 64, and formed in the side of the bracket arm 64 adjacent the leg 50 is an elongated longitudinal slot 68 for accommodating the nut 58 previously referred to.

Secured to the bracket arm 64 adjacent the thumb piece 66 and extending perpendicularly therefrom below the under side thereof is a lens carriage 70 which extends parallel to the supporting arm 36 and is provided with an elongated longitudinally extending shaft 72 carrying at the end of the carriage 70 adjacent the arm 64 a thumb piece 74 by which the shaft 72 may be rotated. Carried intermediate the ends of the shaft 72 is the worm 76 which has meshing engagement with a worm wheel segment 78 which is carried by an arcuate lens support 80 which is mounted for rotation in a track segment 82 which is carried by and depends from the lens carriage 70.

The supporting arm 36 is provided with longitudinally spaced indices 84 which serve to give a reading of the horizontal position of the leg 50 relative to the arm 36, and carried by the leg 50 are indices 86 by which the vertical position of the arm 64 can be determined. Similar longitudinally spaced indices 88 are carried by the arm 64 by which its horizontal position on the leg 50 may be determined, and carried by the lens support 80 is an arcuate series of indices 90 by which the position of a lens in the lens carriage 70 can be determined, the lens support 80 being adapted to receive also uncut lens for spotting purposes.

With the device mounted on a lens power measuring instrument as above described, a lens may be mounted in the lens support 80 between the telescope 14 and lens stop 20 by turning the thumb pieces 46 and 56, the position of the lens between the telescope and the target 16 can be varied until the optical center comes in line with the target in the lens power measuring instrument. With the lens or lenses against the lens stop, by turning 66 you can move the lens or lenses away from the stop the amount necessary, and then bring the lens power measuring instrument into focus and read the power. Obviously by turning the thumb piece 74, the lens will be rotated about an axis which lies parallel with the horizontal bracket arm 64 and by adjusting the parts, the axis of the lens may be brought into axial alignment with the telescope and target. When the proper adjustments have been achieved, a reading of the indices 84, 86, 88 and 90 may be obtained and translated into a formula by which other lenses may be ground to correct for the distance between the eye and the lens when the latter is in use.

By the use of this instrument it is possible for the practitioner to easily and quickly arrive at the correct lens strength and all guesswork in connection with the proper fitting of glasses to a user is avoided.

What is claimed is:

1. In a lens power measuring instrument of the type having a telescope, a target, and a lens stop between the telescope and the target on a common axis, means for adjustably supporting a lens adjacent the lens stop and at the end thereof remote from the target, said means comprising an elongated horizontally disposed supporting arm carried intermediate its ends on a bracket mounted over the lens stop, an elongated vertically disposed leg carried adjacent one end by the supporting arm for adjustment longitudinally thereof in a rectilinear path adjacent the supporting arm, an elongated bracket arm carried by the leg for adjustment vertically in a rectilinear path adjacent the leg which lies perpendicular to the path of movement of the leg, said bracket arm also being adjustable horizontally on said leg, and a lens carriage carried by the bracket arm for rotation about an axis which lies parallel to the axis of the instrument, whereby the lens may be adjusted axially or transversely of the axis while being maintained in a plane normal to the axis.

2. The structure defined in claim 1 in which the supporting means is demountably supported over the lens stop.

3. The structure defined in claim 2 in which the demountable support comprises a tapered socket carried by the lens stop, and a tapered plate carried by the supporting arm for engagement with the tapered walls of the socket.

4. The structure defined in claim 1 in which a screw extends longitudinally through the supporting arm, a nut is carried by the leg and threadedly engages the screw in the supporting arm, screws extend longitudinally through the leg and through the bracket arm and a nut is carried by the bracket arm and threadedly engages the screw therein and the screw in the leg.

5. The structure defined in claim 1 in which a segmental worm wheel is carried by the lens carriage and a worm is carried by and extends longitudinally within the bracket arm for engaging the worm segment and turning the lens carriage when the worm is rotated.

References Cited in the file of this patent

UNITED STATES PATENTS

| 432,614 | Hendrick | July 22, 1890 |
| 1,518,393 | Currier | Dec. 9, 1924 |
| 1,585,489 | Hailman | May 18, 1926 |
| 1,794,571 | Wrighton et al. | Mar. 3, 1931 |
| 1,891,041 | Bennett | Dec. 3, 1932 |

FOREIGN PATENTS

| 954,054 | France | June 6, 1949 |